A. PERNULA.
SPRING WHEEL.
APPLICATION FILED MAR. 15, 1916.

1,270,199.

Patented June 18, 1918.

INVENTOR
Andrew Pernula,

WITNESSES

BY

ATTORNEY

UNITED STATES PATENT OFFICE.

ANDREW PERNULA, OF ONEIDA, WASHINGTON.

SPRING-WHEEL.

1,270,199.  Specification of Letters Patent.  Patented June 18, 1918.

Application filed March 15, 1916. Serial No. 84,405.

*To all whom it may concern:*

Be it known that I, ANDREW PERNULA, a citizen of the Grand Duchy of Finland, residing at Oneida, in the county of Wahkiakum and State of Washington, have invented certain new and useful Improvements in Spring-Wheels, of which the following is a specification.

This invention relates to spring wheels and the primary object of the invention is to provide means that may be attached to a wheel of ordinary construction whereby it will contain all the resilient qualities of a pneumatic tire which may be easily mounted upon or removed from a wheel of ordinary construction.

The invention further aims to provide a device of this character which will consist of comparatively few parts and will be simple in construction but durable and easily applied to any ordinary wheel, whereby the common expedient of a pneumatic tire may be dispensed with.

For a full description of the invention and the advantages and merits thereof, reference is to be had to the following description and the accompanying drawings, wherein is illustrated the preferred form of my invention, in which, Figure 1 is a fragmentary side elevation of a wheel showing my invention applied thereto.

Figure 1:
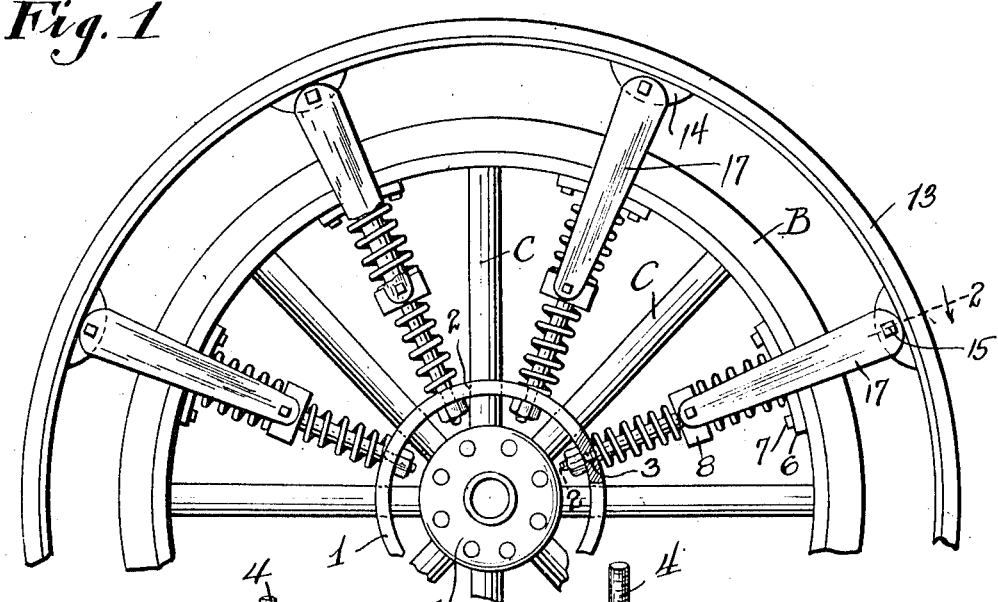
Figure 2:
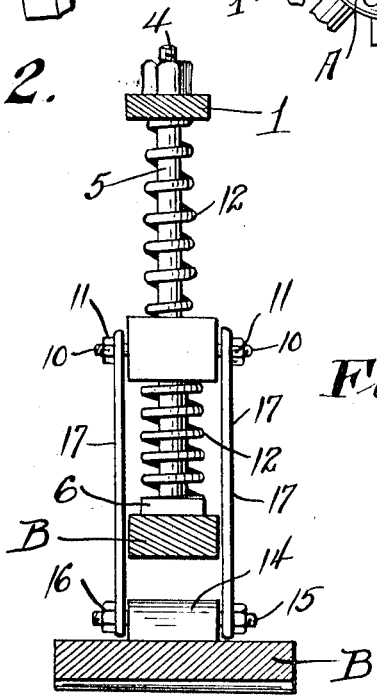
Fig. 2 is a section on the line 2—2 of Fig. 1.
Figure 3:
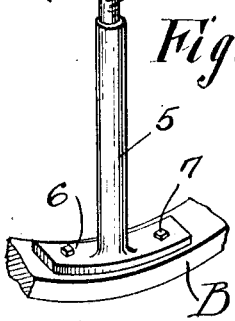
Fig. 3 is a perspective view of one of the rods.
Figure 5:
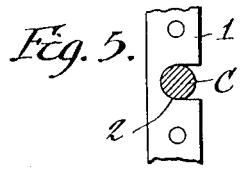
Fig. 5 is a fragmentary view of a detail of the invention.
Figure 4:
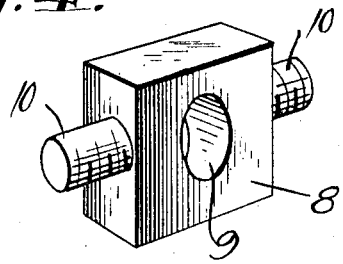
Fig. 4 is a perspective view of one of the sliding blocks showing the trunnions formed thereon.

The ordinary wheel is employed which consists of the hub A, the felly B and the usual spokes C. Mounted upon the spokes C is a ring 1 which is slightly spaced away from the hub A and extends completely around the hub. The spokes of the wheel are extended through a plurality of apertures 2 which are formed in the ring 1 and the ring is thereby supported in spaced relation to the hub A. A plurality of smaller openings 3 is provided in the ring 1, the openings being spaced on the ring between each of the openings 2 and are adapted to receive the reduced ends 4 of the rods 5 which are provided with integrally formed flanges 6 at their ends opposite to the ends upon which the reduced end 4 is formed, the flanges 6 having apertures through which bolts 7 are adapted to pass, whereby they may be securely fastened to the inner face of the felly B. The reduced portion 4 of the rods 5 is provided with screw threads upon which nuts are mounted for securing the rods to the ring 1, the shoulder formed by the reduced portion 4 of the rods resting against the outer face of the ring 1. The rods 5 are thereby held rigidly in position in the space between the spokes C and in radial disposition with respect to the hub of the wheel.

A sliding block 8 is mounted upon each of the rods 5 intermediate their ends, the rod 5 extending through an aperture 9 which is formed centrally in the block 8. Integrally formed and laterally extending from two of the side faces of the block 8 are the trunnions 10 which are screw threaded for a short portion of their length for receiving fastening nuts 11. Interposed between the ring 1 and the block 8 and between the flange 7 and the block 8 are coil springs 12 which surround the rod 5 and are adapted to bear against the opposite faces of the block 8 for imparting resiliency thereto.

A rim 13 is of a diameter greater than the diameter of the felly of the wheel whereby a space is provided between the felly of the wheel and the rim 13. The rim 13 is provided on its inner face with lugs 14, from the opposite sides of which are extended trunnions 15 which are provided with screw threads for the reception of nuts 16. A pair of supporting arms 17 have their ends provided with openings which are adapted to receive the trunnions 10 of the block 8 and the trunnions 15 of the lugs 14 and are secured on the trunnions by means of the nuts 11 and 16. The rim 13 is thereby resiliently supported by the supporting arms 17 by virtue of their connection with the blocks 8 which are slidably mounted on the rods 5 and receive their resiliency from the springs 12.

From the foregoing it will be observed that a very simple and durable spring wheel has been provided, the details of which embody the preferred form. I desire it to be understood however, that slight changes or modifications in the minor details of construction may be made without departing from the spirit of the invention or the scope of the claim hereunto appended.

I claim:

In combination with a wheel having a hub, felly and spokes, a rim surrounding and spaced apart from the felly, a plurality of radially extending guide rods fixed to the felly between the said spokes, the ends of the guide rods being extended through the space between the spokes and terminating in close proximity to the hub, resilient means mounted on the guide rods and connected to the said rim to support the said rim, said means including springs coiled about the said rods, and a ring provided with a plurality of circumferentially spaced openings, the said openings each adapted to receive one of the said spokes, the said ring also having a plurality of apertures arranged between the said openings for the spokes to receive the ends of the said guide rods, and nuts mounted upon the guide rods and engageable with the inner surface of the said ring.

In testimony whereof I affix my signature in presence of two witnesses.

ANDREW PERNULA.

Witnesses:
W. U. MESERNE,
W. W. CHADWICK.

Copies of this patent may be obtained for five cents each, by addressing the "Commissioner of Patents, Washington, D. C."